(12) United States Patent
Escudero Rodriguez et al.

(10) Patent No.: US 11,050,354 B2
(45) Date of Patent: Jun. 29, 2021

(54) BI-DIRECTIONAL LLC CONVERTER

(71) Applicant: Infineon Technologies Austria AG, Villach (AT)

(72) Inventors: Manuel Escudero Rodriguez, Villach (AT); Matteo-Alessandro Kutschak, Ludmannsdorf (AT); David Meneses Herrera, Villach (AT)

(73) Assignee: Infineon Technologies Austria AG, Villach (AT)

(*) Notice: Subject to any disclaimer, the term of this patent is extended or adjusted under 35 U.S.C. 154(b) by 96 days.

(21) Appl. No.: 16/585,166

(22) Filed: Sep. 27, 2019

(65) Prior Publication Data

US 2021/0099096 A1   Apr. 1, 2021

(51) Int. Cl.
*H02M 3/335*  (2006.01)
*H02M 1/08*  (2006.01)
(Continued)

(52) U.S. Cl.
CPC ......... *H02M 3/33584* (2013.01); *B60L 50/66* (2019.02); *B60L 58/18* (2019.02);
(Continued)

(58) Field of Classification Search
CPC ..... H02M 3/33584; H02M 1/08; B60L 58/18; B60L 50/66; B60L 2210/20; H02J 7/00;
(Continued)

(56) References Cited

U.S. PATENT DOCUMENTS 9,931,951 B2 * 4/2018 Khaligh ............... B60L 53/22
10,439,501 B2 * 10/2019 Liu ....................... H02M 3/335
(Continued)

FOREIGN PATENT DOCUMENTS

WO   WO-2019121477 A1 * 6/2019  ........ H02M 3/33584

OTHER PUBLICATIONS

Chakraborty, Sajib, et al., "DC-DC Converter Topologies for Electric Vehicles, Plug-in Hybrid Electric Vehicles and Fast Charging Stations: State of the Art and Future Trends", www.mdpi.com/journal/energies, Apr. 25, 2019, 1-43.
(Continued)

*Primary Examiner* — Jared Fureman
*Assistant Examiner* — Duc M Pham
(74) *Attorney, Agent, or Firm* — Murphy, Bilak & Homiller, PLLC

(57) ABSTRACT

A bi-directional LLC converter includes: first and second sides coupled by an isolation transformer, the first side including a switch network connected to an LLC network, the LLC network including a first winding of the isolation transformer, the second side including a switch network connected to a second winding of the isolation transformer; and a controller operable to operate the LLC converter in a forward mode in which the first side functions as an inverter and the second side functions as a rectifier, and to operate the LLC converter in a reverse mode in which the second side functions as an inverter and the first side functions as a rectifier. In the reverse mode, the controller is operable to delay turn off of the switch network on the first side at an operating frequency above resonance of the LLC converter, to yield a gain greater than one in the reverse mode.

20 Claims, 14 Drawing Sheets

(51) Int. Cl.
  *B60L 50/60* (2019.01)
  *B60L 58/18* (2019.01)
  *H02J 7/00* (2006.01)

(52) U.S. Cl.
  CPC .................. *H02J 7/00* (2013.01); *H02M 1/08* (2013.01); *B60L 2210/20* (2013.01); *B60L 2210/40* (2013.01); *B60Y 2200/91* (2013.01); *B60Y 2300/91* (2013.01); *B60Y 2400/61* (2013.01); *H02J 2207/20* (2020.01)

(58) Field of Classification Search
  CPC ............. H02J 2207/20; B60Y 2300/91; B60Y 2400/61
  See application file for complete search history.

(56) References Cited

U.S. PATENT DOCUMENTS

| | | | | |
|---|---|---|---|---|
| 2011/0317452 | A1* | 12/2011 | Anguelov | H02M 3/3376 363/21.02 |
| 2020/0052604 | A1* | 2/2020 | Tayebi | H01L 31/042 |
| 2020/0177089 | A1* | 6/2020 | Abdel-Rahman | H02J 7/0068 |

OTHER PUBLICATIONS

Cao, Qi, et al., "Wide Voltage Gain Range LLC DC/DC Topologies: State-of-the-Art", 2018 International Power Electronics Conference (IPEC-Niigata 2018—ECCE Asia), May 20-24, 2018, 100-107.

Kim, Keon-Woo, et al., "Analysis on Synchronous Rectifier Control to Improve Regulation Capability of High-Frequency LLC Resonant Converter", IEEE Transactions on Power Electronics, vol. 33, No. 8, Aug. 2018, 7252-7259.

Krismer, F. et al., "A Comparative Evaluation of Isolated Bi-directional DC/DC Converters with Wide Input and Output Voltage Range", IEEE Fourtieth IAS Annual Meeting. Conference Record of the 2005 Industry Applications Conference, Oct. 2-6, 2005, 598-606.

Li, Haoran, et al., "A 6.6kW SiC Bidirectional On-board Charger", 2018 IEEE Applied Power Electronics Conference and Exposition (APEC), Mar. 2018, 1171-1178.

Shafiei, Navid, et al., "Burst Mode Elimination in High-Power LLC Resonant Battery Charger for Electric Vehicles", IEEE Transactions on Power Electronics, vol. 31, No. 2, Feb. 2016, 1173-1188.

* cited by examiner

BI-DIRECTIONAL LLC CONVERTER

BACKGROUND

An LLC converter is a resonant converter having an inverter such as a switching bridge on the primary side that generates a square waveform to excite the LLC resonant tank, which outputs a resonant sinusoidal current that is scaled and rectified by an isolation transformer and a rectifier circuit on the secondary side in forward mode. An output capacitor filters the rectified ac current and outputs a DC voltage. For some applications, it may be desirable to operate an LLC converter in both forward and reverse modes.

In forward mode, the gain of the LLC converter depends on the switching frequency. The gain decreases above the resonance of the LLC converter (buck operation) and increases below the resonance of the LLC converter (boost operation). The gain also depends on the load of the LLC converter. For heavy loads, the boost capability of the LLC converter decreases. For light loads, the buck capability of the LLC converter reduces. This behavior is aggravated by the effects of additional circuit parasitics which may cause the LLC converter gain to actually increase as the switching frequency goes up. As a consequence, the design of a LLC converter having a wide output and/or wide input range requires special design considerations, such as increased magnetizing current, with a consequential decrease in overall efficiency, and/or control techniques (e.g. burst mode), especially at light load conditions or minimum output voltage.

In reverse mode, the rectifier circuit on the secondary side of the LLC converter functions as a switching bridge and the inverter on the primary side functions as a rectifier. When operating in reverse mode, the maximum possible gain is lower than or equal to one. The LLC converter operates as a serial resonant converter in this mode. This limits the practical usefulness of the reverse operation mode of conventional LLC converters, which are often replaced by CLLC or other symmetrical topologies such as dual active bridge (DAB) when bi-directional capability is needed.

Hence, there is a need for an improved bi-directional LLC converter.

SUMMARY

According to an embodiment of a bi-directional LLC converter, the bi-directional LLC converter comprises: a first side coupled to a second side by an isolation transformer, the first side comprising a switch network connected to an LLC network, the LLC network including a first winding of the isolation transformer, the second side comprising a switch network connected to a second winding of the isolation transformer; and a controller operable to operate the bi-directional LLC converter in a forward mode in which the first side functions as an inverter and the second side functions as a rectifier, and to operate the bi-directional LLC converter in a reverse mode in which the second side functions as an inverter and the first side functions as a rectifier, wherein in the reverse mode, the controller is operable to delay turn off of the switch network on the first side at an operating frequency above resonance of the bi-directional LLC converter, to yield a gain greater than one in the reverse mode.

In one embodiment, the controller is operable to increase the operating frequency to a maximum value before delaying turn off of the switch network on the first side in the reverse mode.

Separately or in combination, the controller is operable to increase the operating frequency as part of a first control loop and delay the turn off of the switch network on the first side as part of a second control loop having a lower priority than the first control loop.

Separately or in combination, the controller is operable to incrementally increase the turn off delay for the switch network on the first side in the reverse mode.

Separately or in combination, the controller comprises a timer and a delay block for delaying the turn off of the switch network on the first side in the reverse mode.

Separately or in combination, the controller is operable to determine an amount of turn off delay for the switch network on the first side in the reverse mode based on the operating frequency and an output voltage at the first side of the bi-directional LLC converter.

Separately or in combination, the controller is operable to soft switch a high-voltage side of the switch network on the first side and partially hard switch or hard commutate a low-voltage side of the switch network on the first side, to delay turn off of the switch network on the first side in the reverse mode.

Separately or in combination, the controller is operable to soft switch a high-voltage side and a low-voltage side of the switch network on the first side, to delay turn off of the switch network on the first side in the reverse mode.

Separately or in combination, in the forward mode, the controller is operable to advance turn on of the switch network on the second side at an operating frequency above resonance of the bi-directional LLC converter, to decrease gain of the bi-directional LLC converter in the forward mode.

Separately or in combination, the controller is operable to increase the operating frequency to a maximum value before advancing turn on of the switch network on the second side in the forward mode.

Separately or in combination, the controller is operable to increase the operating frequency as part of a first control loop and advance the turn on of the rectifier on the second side as part of a second control loop having a lower priority than the first control loop.

Separately or in combination, the controller is operable to incrementally increase the turn on advancement for the switch network on the second side in the forward mode.

Separately or in combination, the controller is operable to soft switch a high-voltage side of the rectifier on the second side and hard commutate a low-voltage side of the switch network on the second side, to advance turn on of the switch network on the second side in the forward mode.

According to an embodiment of a method of operating a bi-directional LLC converter having a first side coupled to a second side by an isolation transformer, the first side comprising a switch network connected to an LLC network, the LLC network including a first winding of the isolation transformer, the second side comprising a switch network connected to a second winding of the isolation transformer, the method comprises: operating the bi-directional LLC converter in a forward mode in which the first side functions as an inverter and the second side functions as a rectifier; operating the bi-directional LLC converter in a reverse mode in which the second side functions as an inverter and the first side functions as a rectifier; and in the reverse mode, delaying turn off of the switch network on the first side at an operating frequency above resonance of the bi-directional LLC converter, to yield a gain greater than one in the reverse mode.

According to an embodiment, the method further comprises: increasing the operating frequency to a maximum value before delaying turn off of the switch network on the first side in the reverse mode.

Separately or in combination, the method further comprises: determining an amount of turn off delay for the switch network on the first side in the reverse mode based on the operating frequency and an output voltage at the first side of the bi-directional LLC converter.

Separately or in combination, the method further comprises: in the forward mode, advancing turn on of the switch network on the second side at an operating frequency above resonance of the bi-directional LLC converter, to decrease gain of the bi-directional LLC converter in the forward mode.

Separately or in combination, the method further comprises: increasing the operating frequency to a maximum value before advancing turn on of the switch network on the second side in the forward mode.

According to an embodiment of an electronic system, the electronic system comprises: a voltage bus; a battery; and a bi-directional LLC converter comprising: a first side coupled to a second side by an isolation transformer, the first side comprising a switch network connecting the voltage bus to an LLC network, the LLC network including a first winding of the isolation transformer, the second side comprising a switch network connecting a second winding of the isolation transformer to the battery; and a controller operable to operate the bi-directional LLC converter in a forward mode in which energy is transferred from the voltage bus to the battery, and to operate the bi-directional LLC converter in a reverse mode in energy is transferred from the battery to the voltage bus, wherein in the reverse mode, the controller is operable to delay turn off of the switch network on the first side at an operating frequency above resonance of the bi-directional LLC converter, to yield a gain greater than one in the reverse mode.

According to an embodiment, the battery is an auxiliary battery of an electric vehicle, the voltage bus connects the bi-directional LLC converter to a battery switch for a propulsion battery of the electric vehicle, the battery switch is configured to disconnect the propulsion battery from the voltage bus if the electric vehicle is idle, and the controller is operable to operate the bi-directional LLC converter in the reverse mode if the propulsion battery is disconnected from the voltage bus, so that the voltage bus can be pre-charged via the auxiliary battery.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a modulation scheme for a bi-directional LLC converter so that the LLC converter has a gain greater than one in reverse mode at an operating frequency above resonance of the converter. The modulation scheme may also provide decreased gain in forward mode at an operating frequency above resonance of the bi-directional LLC converter, if desired.

The modulation scheme includes delaying turn off of the switch network on the primary side of the bi-directional LLC converter at an operating frequency above resonance of the LLC converter, to yield a gain greater than one in reverse mode. The delayed turn off of the switch network on the primary side of the LLC converter increases the initial current at the start of the next power transfer and therefore the total amount of energy transferred, yielding a gain greater than one in reverse mode.

The modulation scheme may also include advancing turn on of the switch network on the secondary side of the bi-directional LLC converter at an operating frequency above resonance of the LLC converter, to decrease gain of the converter in forward mode if desired. The early turn on of the switch network on the secondary side of the LLC converter decreases the initial current at the start of the next power transfer and therefore the total amount of energy transferred, yielding decreased gain in forward mode.

Figure 1:
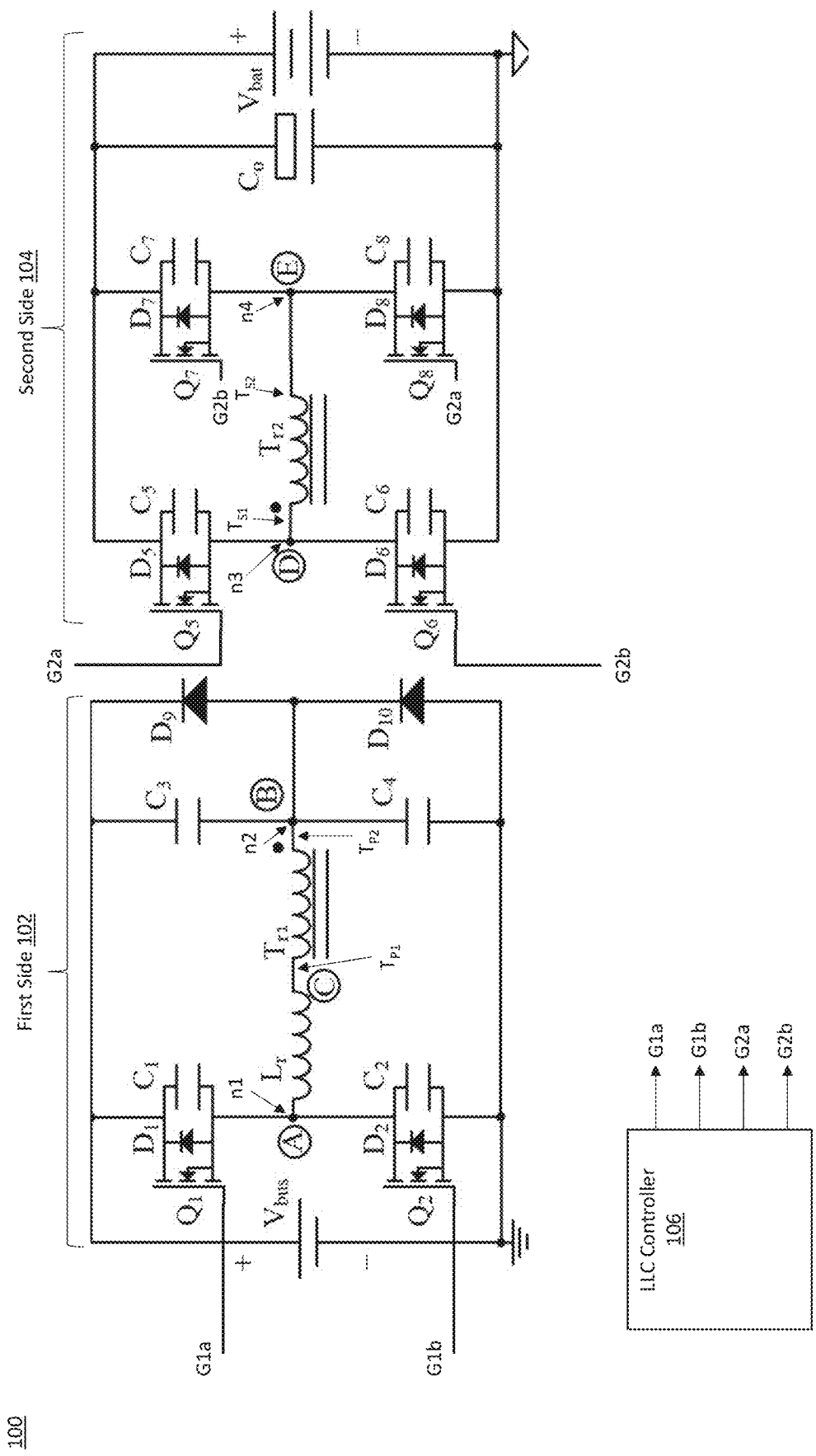
FIG. 1 illustrates a schematic diagram of an embodiment of a bi-directional LLC converter.

FIG. 1 illustrates an embodiment a bi-directional LLC converter 100. The bi-directional LLC converter 100 includes a first (primary) side 102 coupled to a second (secondary) side 104 by an isolation transformer. The first side 102 of the bi-directional LLC converter 100 includes a switch network $Q_1$-$Q_2$ connected to an LLC network $L_r$-$T_{r1}$-$C_3$-$C_4$, the LLC network $L_r$-$T_{r1}$-$C_3$-$C_4$ including a first winding $T_{r1}$ of the isolation transformer. The second side 104 of the bi-directional LLC converter 100 includes a switch network $Q_5$-$Q_8$ connected to a second winding $T_{r2}$ of the isolation transformer.

The bi-directional LLC converter 100 also includes a controller 106 for operating the LLC converter 100 in a forward mode in which the first side 102 functions as an inverter and the second side 104 functions as a rectifier, and for operating the LLC converter 100 in a reverse mode in which the second side 104 functions as an inverter and the first side 102 functions as a rectifier. In the reverse mode, the controller 106 delays turn off of the switch network $Q_1$-$Q_2$ on the first side 102 at an operating frequency above resonance of the bi-directional LLC converter 100, to yield a gain greater than one in reverse mode. The resonance of the bi-directional LLC converter 100 is set by the LLC network $L_r$,$T_{r1}$-$C_3$-$C_4$ on the first side 102 of the LLC converter 100.

The switch network $Q_1$-$Q_2$ on the first side 102 of the bi-directional LLC converter 100 is shown as a half bridge comprising high-side switch device $Q_1$ connected in series with low-side switch device $Q_2$ at node 'n1'/'A' to form a first leg of a switching bridge. The other leg of the switching bridge may be formed by diode $D_9$ and diode $D_{10}$ connected in series at node 'n2'/'B'. The switch network $Q_1$-$Q_2$ on the first side 102 of the bi-directional LLC converter 100 may instead be a full bridge by replacing diodes D9 and D10 with an additional high-side switch device connected in series with an additional low-side switch device at node 'n2'/'B' to form the second leg of the switching bridge. In either case, a resonant inductance $L_r$ is present between node n1 and a first terminal '$T_{P1}$' of the first winding $T_{r1}$ of the isolation transformer. The resonant inductance $L_r$ forms part of the LLC network on the first side 102 of the bi-directional LLC converter 100. Node n2 is coupled to a second terminal '$T_{P2}$' of the first winding $T_{r1}$ of the isolation transformer. The isolation transformer is shown as being split between the first side 102 and the secondary side 104 of the LLC converter 100, for ease of illustration.

On the second side 104 of the bi-directional LLC converter 100, the switch network $Q_5$-$Q_8$ is shown as a full bridge rectifier with high-side switch device $Q_5$ connected in series with low-side switch device $Q_6$ at node 'n3/D' to form a first leg of the full bridge, and high-side switch device $Q_7$ connected in series with low-side switch device $Q_8$ at node 'n4/E' to form a second leg of the full bridge. The switch network $Q_5$-$Q_8$ on the second side 104 of the bi-directional LLC converter 100 may instead be a half bridge by replacing second leg $Q_7$-$Q_8$ with a corresponding series connected diodes. Node n3/D is coupled to a first terminal '$T_{s1}$' of the second winding $T_{r2}$ of the isolation transformer and node n4/D is coupled to a second terminal '$Ts_2$' of the second winding Tr2 of the isolation transformer.

Those skilled in the art will readily understand that a different type of switch network may be used on the second side 104 of the bi-directional LLC converter 100 such as, but not limited to, a full bridge, center-taped rectification stage, current doubler rectification stage, etc. Also, the switch devices $Q_1$, $Q_2$ on the first side 102 of the bi-directional LLC converter 100 and the switch devices $Q_5$ through $Q_8$ on the second side 104 of the LLC converter 100 are illustrated as power MOSFETs each having a corresponding freewheeling diode $D_1$-$D_2$ and $D_5$-$D_8$ and parasitic capacitance $C_1$-$C_2$ and $C_5$-$C_8$. However, any suitable power transistor can be used for the switch devices $Q_1$, $Q_2$ on the first side 102 of the bi-directional LLC converter 100 and for the switch devices $Q_5$ through $Q_8$ on the second side 104 of the LLC converter 100, such as but not limited to power MOSFETs, IGBTs (insulated gate bipolar transistors), HEMTs (high-electron mobility transistors), etc.

The LLC controller 106, which may be located on the first or second side 102, 104 of the bi-directional LLC converter 100, controls both switch networks $Q_1$-$Q_2$, $Q_5$-$Q_8$ by respective gate signals G1a, G1b, G2a and G2b. According to the embodiment illustrated in FIG. 1, the first side 102 of the bi-directional LLC converter 100 is coupled to a voltage bus $V_{bus}$ and the second side 104 of the LLC converter 100 is coupled to a battery $V_{bat}$. In forward mode, the LLC controller 106 generates the gate signals G1a, G1b, G2a and G2b so that the switch network $Q_1$-$Q_2$ on the first side 102 of the LLC converter 100 generates a square waveform from the voltage on the voltage bus $V_{bus}$ to excite the LLC network $L_r$-$T_{r1}$-$C_3$-$C_4$, which actively participates in determining the input-to-output power flow in forward mode by outputting a resonant sinusoidal current that gets scaled and rectified by the transformer and the switch network $Q_5$-$Q_8$ on the second side 104 of the LLC converter 100. An output capacitor $C_o$ filters the rectified current and outputs a DC voltage for charging the battery $V_{bat}$.

Figure 2A:
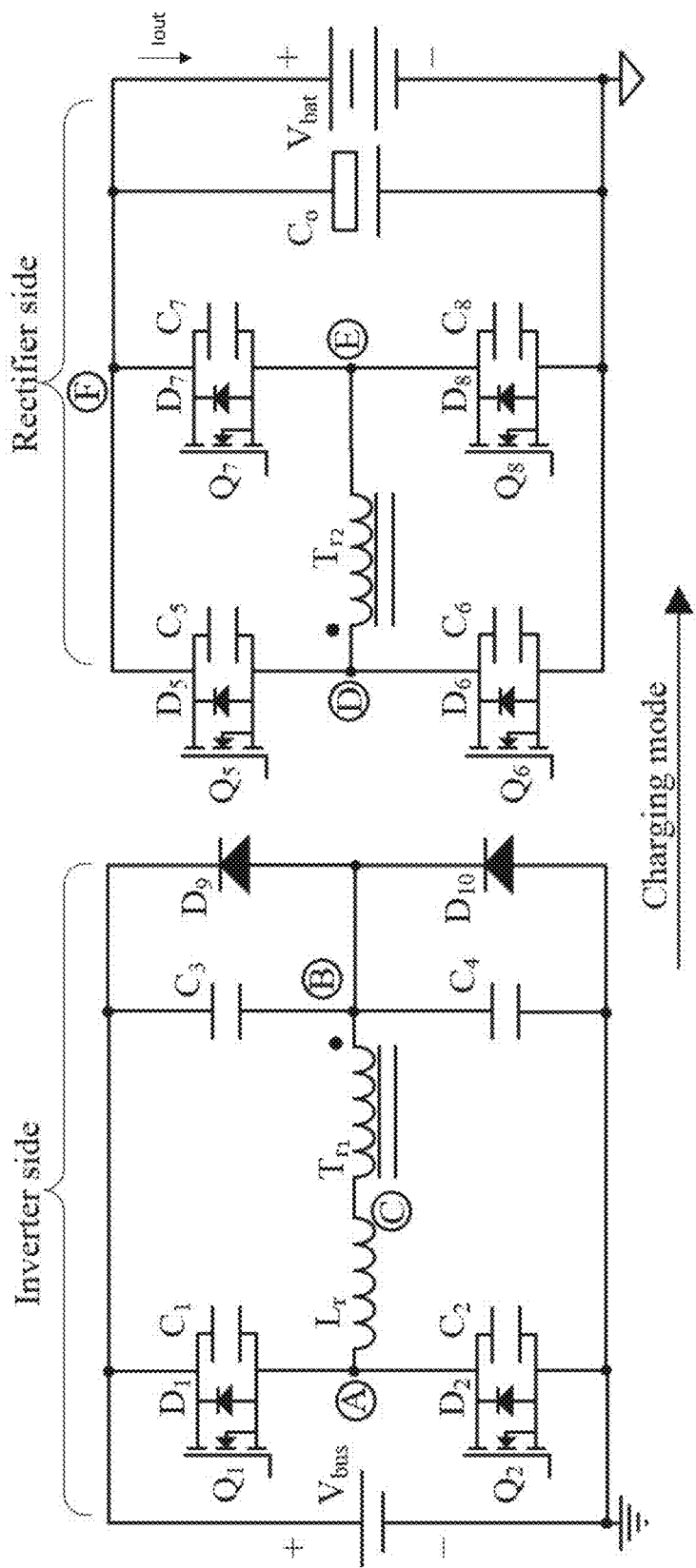
FIGS. 2A through 2C and 4A through 4B illustrate different diagrams associated with the operation of the bi-directional LLC converter in forward mode.

FIG. 2A shows the bi-directional LLC converter 100 configured in forward mode, which is labelled "Charging mode" in FIG. 2A since the LLC converter 100 is being used to charge a battery $V_{bat}$ according to this embodiment. In forward mode, the first side 102 of the LLC converter 100 functions as an inverter and the second side 104 functions as a rectifier.

Figure 2B:
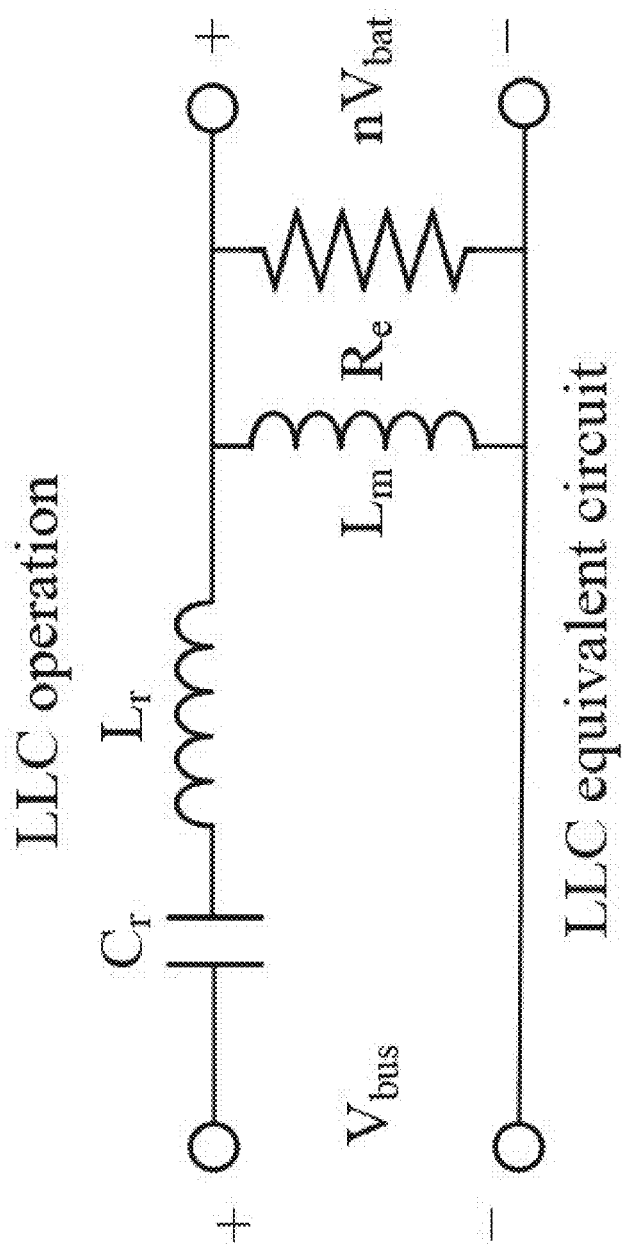

FIG. 2B shows the equivalent circuit for the bi-directional LLC converter 100 during LLC operation in forward mode, where the LLC network is simplified as capacitor $C_r$ and inductors $L_r$ and $L_m$, where $L_m$ is the magnetizing inductance of the first winding $T_{r1}$ of the isolation transformer, $R_e$ is series equivalent resistance, and $C_r$ represents the capacitances on the first side 102 of the converter 100 which form part of the LLC network. The capacitance for the LLC network may come exclusively from the parasitic capacitance (e.g. $C_1$-$C_2$) of the switch devices $Q_1$, $Q_2$ on the first side 102 of the LLC converter 100 and/or may include additional capacitors such as capacitors C3 and C4 shown in FIG. 1. In either case, power is delivered from the voltage bus $V_{bus}$ at the first side 102 of the bi-directional LLC converter 100 to the battery $V_{bat}$ second side 104 of the LLC converter 100 in forward mode.

Figure 2C:
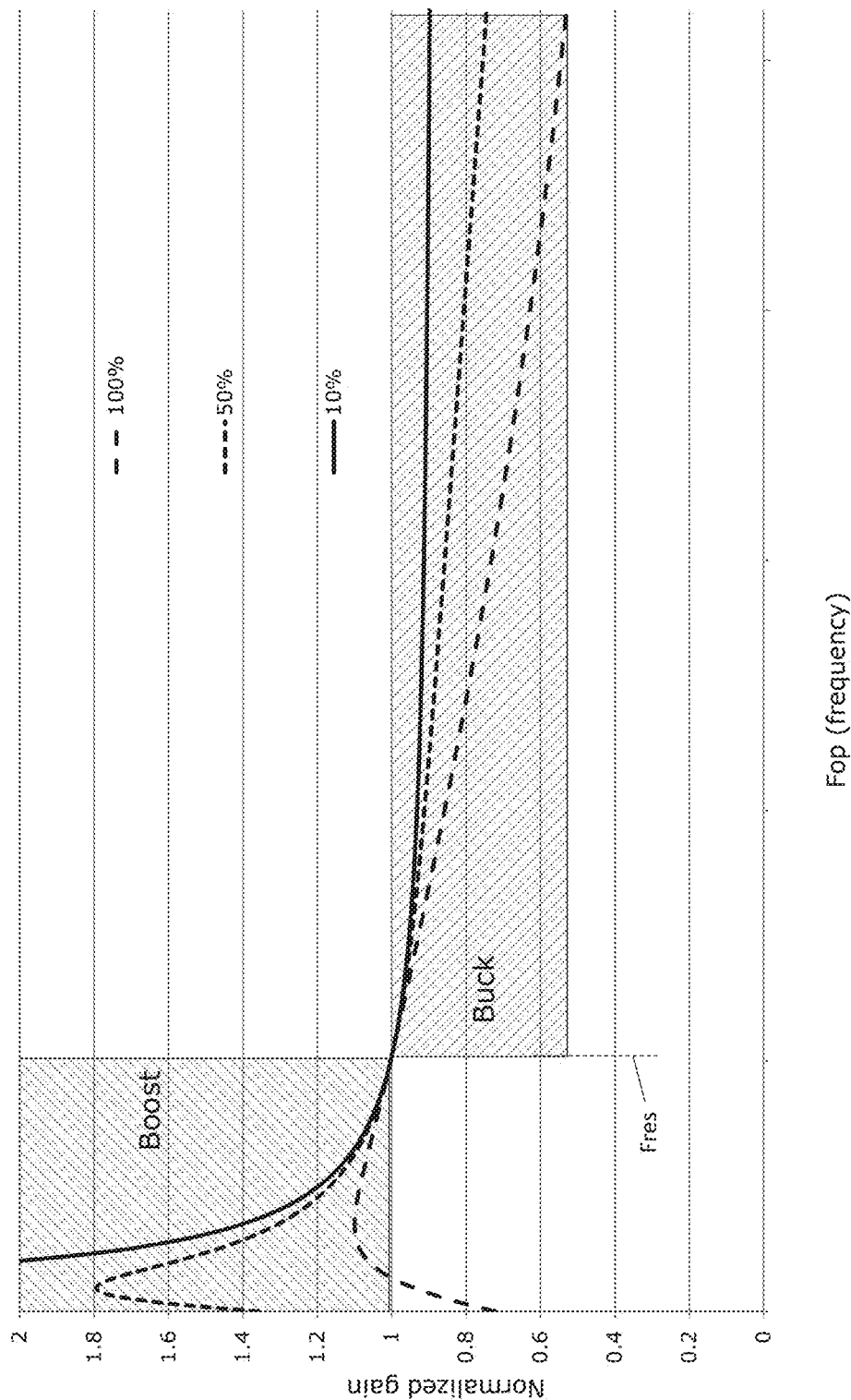

FIG. 2C shows that depending on whether the frequency (Fop) of the bi-directional LLC converter 100 is above or below the resonance (Fres) of the LLC converter 100 as set by the LLC network, the LLC converter 100 may be in boost operation (Fop<Fres) or buck operation (Fop>Fres). Gain greater than one may be realized in boost operation and less than one gain in buck operation, in forward mode. FIG. 2C shows the gain response of the bi-directional LLC converter 100 at three different load conditions: 10%; 50%; and 100%.

Figure 3A:
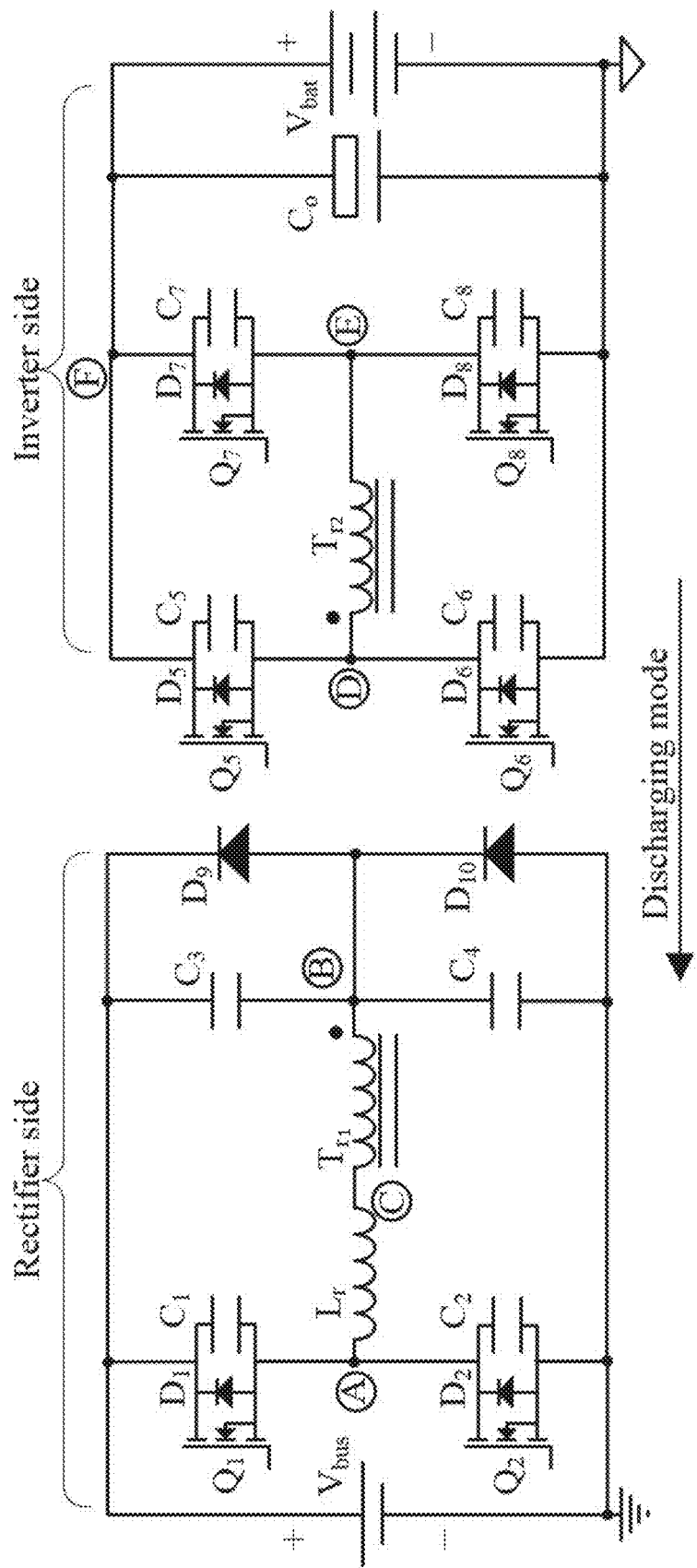
FIGS. 3A through 3C and 5A through 5B illustrate different diagrams associated with the operation of the bi-directional LLC converter in reverse mode.

FIG. 3A shows the bi-directional LLC converter 100 configured in the reverse mode, which is labelled "Discharging mode" in FIG. 3A since the LLC converter 100 is being used to pre-charge the voltage bus $V_{bus}$ from the battery $V_{bat}$ to according to this embodiment. In reverse mode, the second side 104 of the LLC converter 100 functions as an inverter and the first side 102 functions as a rectifier. The LLC converter 100 operates as a series resonant LC converter in reverse mode.

Figure 3B:
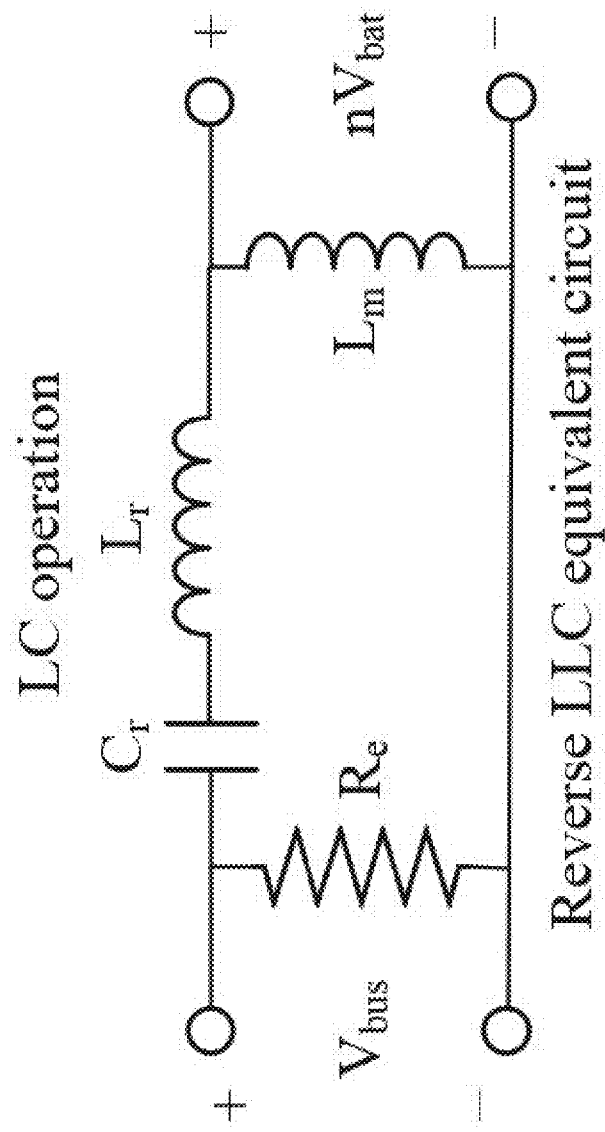

FIG. 3B shows the equivalent circuit for the bi-directional LLC converter 100 during operation in the reverse mode, where the LC network is simplified as capacitor $C_r$ and inductance $L_r$, where $L_m$ is the magnetizing inductance of the second winding $T_{r2}$ of the isolation transformer, $R_e$ is series equivalent resistance, and $C_r$ represents the capacitances on the first side 102 of the LLC converter 100 which form part of the LC network. Power is delivered from the battery $V_{bat}$ the second side 104 of the LLC converter 100 to the voltage bus $V_{bus}$ at first side 102 of the LLC converter 100 in reverse mode.

Figure 3C:
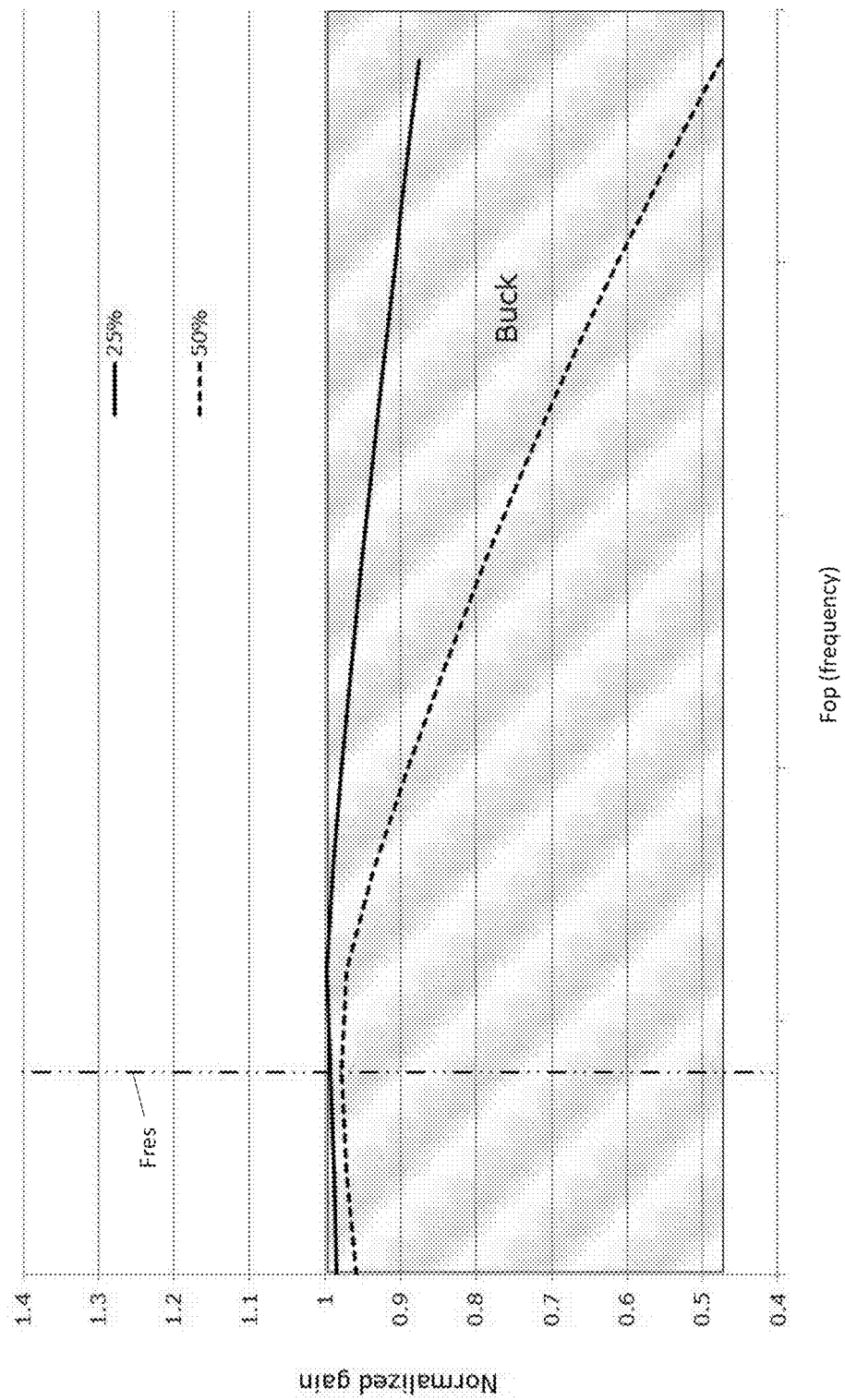

FIG. 3C shows the gain response of the bi-directional LLC converter 100 at two different load conditions: 25%; and 50%. The converter gain is lower than or equal to one (buck operation) in the reverse mode. Operation of the bi-directional LLC converter 100 in the reverse mode is described next in more detail with reference to FIGS. 4A and 4B.

Figure 4A:
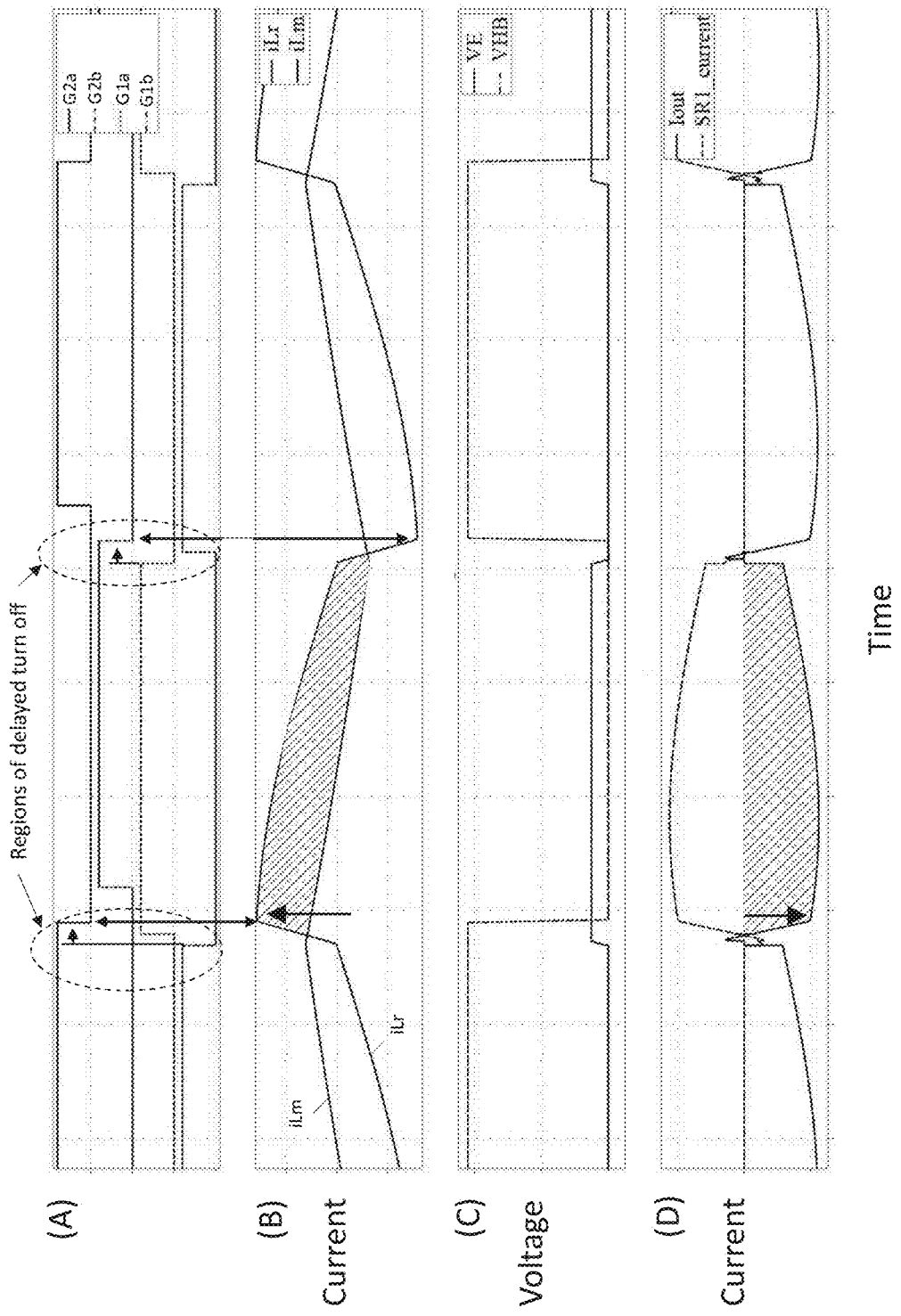

In FIG. 4A, plot (A) shows the gate signals G1a, G1b, G2a and G2b generated by the LLC controller 106 in reverse mode. Plot (B) shows the current (iLr) in the resonant inductance Lr on the first side 102 of the LLC converter 100 and the secondary side reflected current (iLm) in reverse mode. Plot (C) shows the voltage (VHB) across the switch network $Q_1$-$Q_2$ on the first side 102 of the converter 100 and the corresponding gate-emitter/source voltage (VE) of the low-side switch device Q2 on the first side 102 of the converter 100 in reverse mode. Plot (D) shows the output current (Iout) on the second side 104 of the converter 100 and the current (SR1_current) through switch devices $Q_8$ and $Q_5$ on the second side 104 of the converter 100 in reverse mode.

The gain of the bi-directional LLC converter 100 may be increased by delaying the turn off of the switch network $Q_1$-$Q_2$ on the first side 102 of the LLC converter 100, at an operating frequency (Fop) above the resonance (Fres) of the converter 100. The delayed turn off increases the initial current at the start of the next power transfer and therefore the total amount of energy transferred during that power transfer, which is represented by the enclosed area between iLr and iLm in plot (B) of FIG. 4A.

Figure 4B:
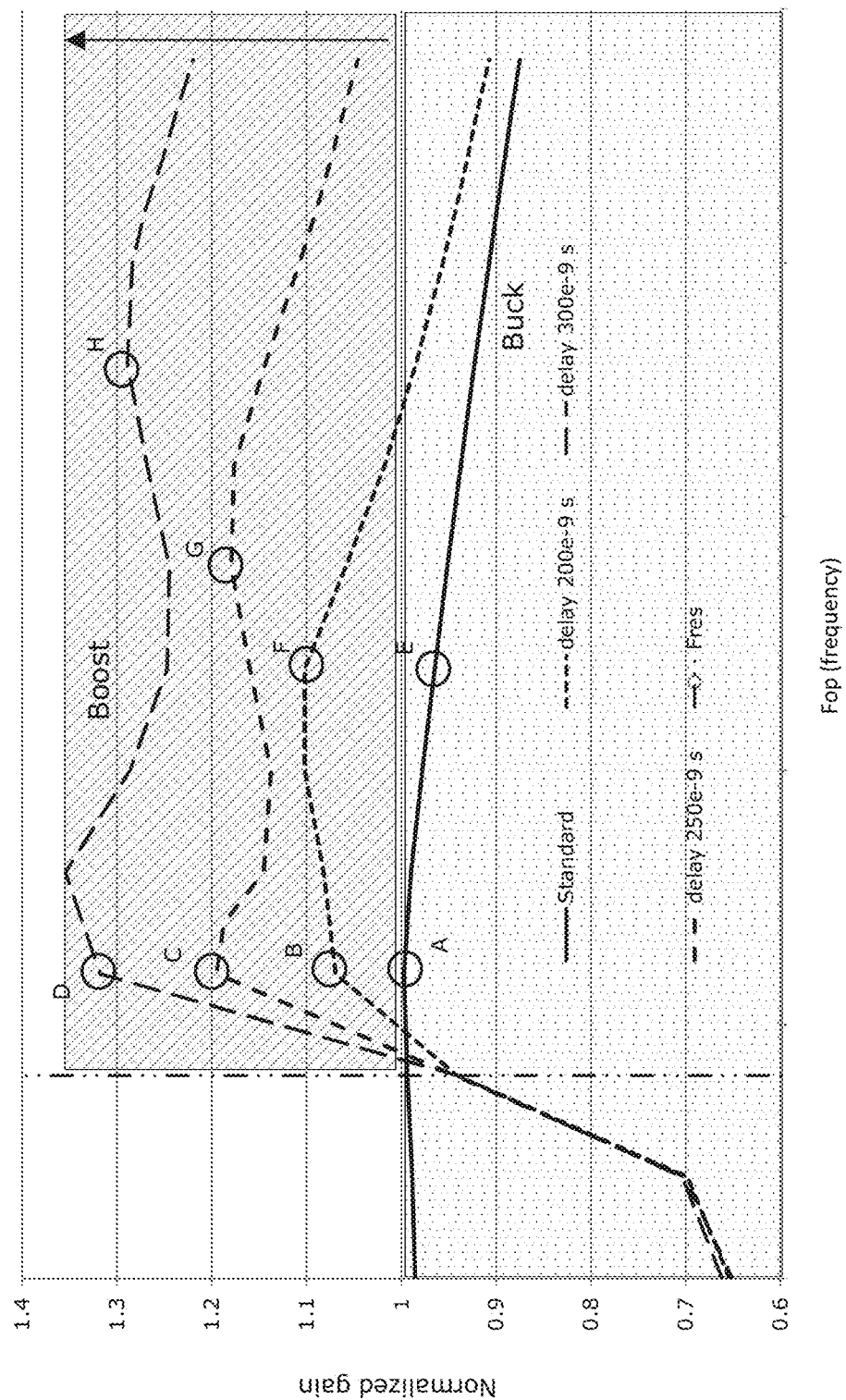

FIG. 4B illustrates resulting gains for a simulation of the bi-directional LLC converter 100 both with standard modulation and by applying different turn off delays to the switch network $Q_1$-$Q_2$ on the first side 102 of the LLC converter 100 in reverse mode. The gains plotted in FIG. 4B demonstrate the effect of the modulation scheme described herein, and the simulated turn off delay values shown in FIG. 4B are purely exemplary and should not be considered limiting in any way. Standard modulation would not delay the turn off of the switch network $Q_1$-$Q_2$ on the first side 102 of the LLC converter 100 in reverse mode. Points A through H represent different operating frequency and turn off delay combinations, where points A and E represent standard modulation with no turn off delay.

The phrase "delaying turn off" as used herein refers to turning off the switch devices $Q_1$, $Q_2$ on the first side 102 of the converter 100 in reverse mode later than what is typically done. Standard control for turning off the switch devices $Q_1$, $Q_2$ on the first side 102 of the converter 100 would include turning off the switch devices $Q_1$, $Q_2$ when the current (iLr) passing through the resonant inductance Lr crosses the magnetizing current (iLm). At this point, conduction of the switch devices $Q_1$, $Q_2$ on the first side 102 of the LLC converter 100, which collectively function as a rectifier in reverse mode, is finished. Hence, the switch devices $Q_1$, $Q_2$ on the first side 102 of the LLC converter 100 are typically turned off with zero current.

According to the modulation scheme described herein, turn off of the switch devices $Q_1$, $Q_2$ on the first side 102 of the bi-directional LLC converter 100 is delayed in reverse mode to keep the transformer shorted. Shorting the transformer allows the full voltage of the primary winding $T_{r1}$ to be applied to the resonant inductance Lr. However, this means that current is non-zero in the switch devices $Q_1$, $Q_2$ on the first side 102 of the LLC converter 100 at the time of turn off. With an appropriate delay setting, hard commutation may be avoided because the non-zero current is against the channel (conducting in reverse to the diodes $D_1$, $D_2$). The extra lift provided to the iLr current in the primary winding $T_{r1}$ by delaying turn off of the switch devices $Q_1$, $Q_2$ on the first side 102 of the LLC converter 100 in reverse mode allows the next power transfer to start with more current.

Operation of the bi-directional LLC converter 100 in the forward mode is described next in more detail with reference to FIGS. 5A and 5B. In forward mode, the modulation scheme described herein may advance the turn on of the switch network $Q_5$-$Q_8$ on the second side 104 of the bi-directional LLC converter 100 at an operating frequency above resonance of the LLC converter 100, to decrease the converter gain and provide additional bucking capability in forward mode if needed. Such extended bucking capability may be useful in applications such as lighting where a wide output range is needed.

Figure 5A:
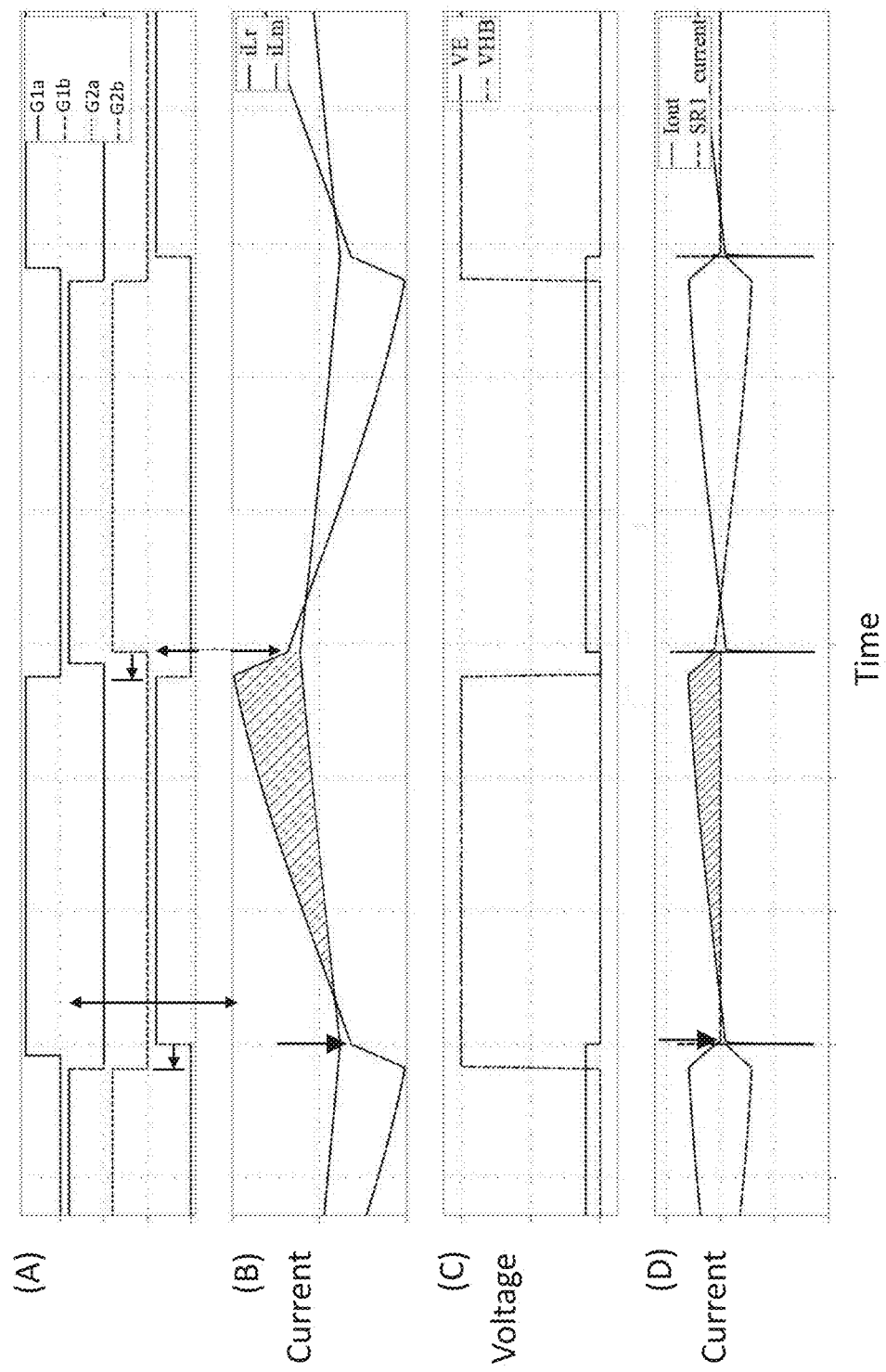

Plots (A) through (D) in FIG. 5A correspond to plots (A) through (D) in FIG. 4A, respectively, except in forward mode of operation. As shown in FIG. 5A, early turn on of the switch network $Q_5$-$Q_8$ on the second side 104 of the bi-directional LLC converter 100 decreases the initial current at the start of the next power transfer and therefore the total amount of energy transferred during that power transfer, which is represented by the enclosed area between iLr and iLm in plot (B) of FIG. 5A.

Figure 5B:
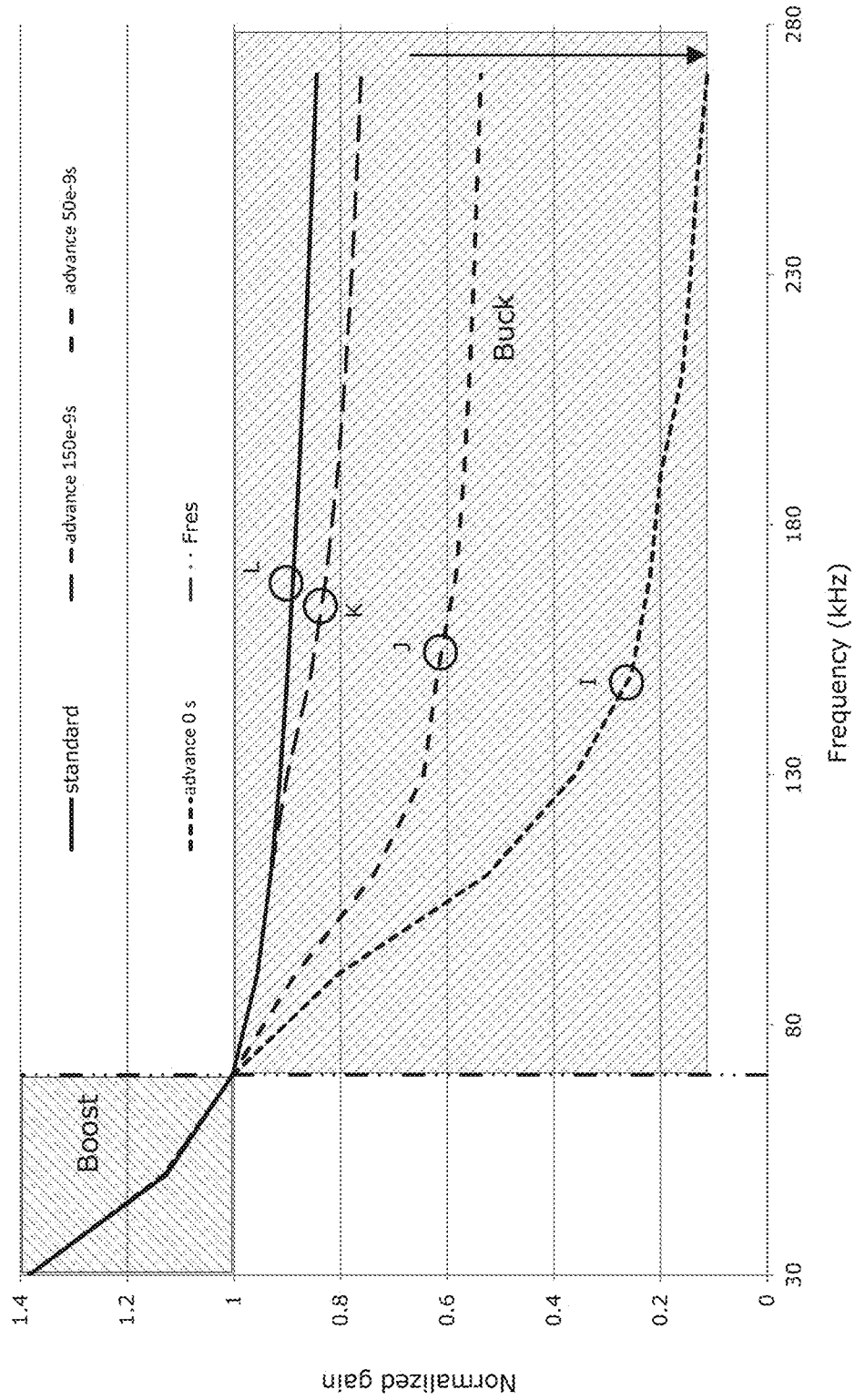

FIG. 5B illustrates resulting gains for a simulation of the bi-directional LLC converter 100 both with standard modulation and by applying different turn on advancements for the switch network $Q_5$-$Q_8$ on the second side 104 of the LLC converter 100 in forward mode. The gains plotted in FIG. 5B demonstrate the effect of the modulation scheme described herein, and the simulated turn on advancement values in FIG. 5B are purely exemplary and should not be considered limiting in any way. Standard modulation would not advance the turn on of the switch network $Q_5$-$Q_8$ on the second side 104 of the LLC converter 100 in forward mode. Points I through L represent different operating frequency and turn on advancement combinations, where point L represents standard modulation with no turn on advancement.

By turning on the switch network $Q_5$-$Q_8$ on the second side 104 of the bi-directional LLC converter 100 early in forward mode, the power transfer is shifted down (reduced) and the energy transfer (buck mode) starts under the magnetizing current (decreased energy). The switch network $Q_5$-$Q_8$ on the second side 104 of the bi-directional LLC converter 100 may be realized by GaN or SiC devices which are more robust than Si devices, because hard commutation of the switch devices $Q_5$-$Q_8$ may occur by turning on the switch devices $Q_5$-$Q_8$ earlier than what is typically done.

Figure 6:
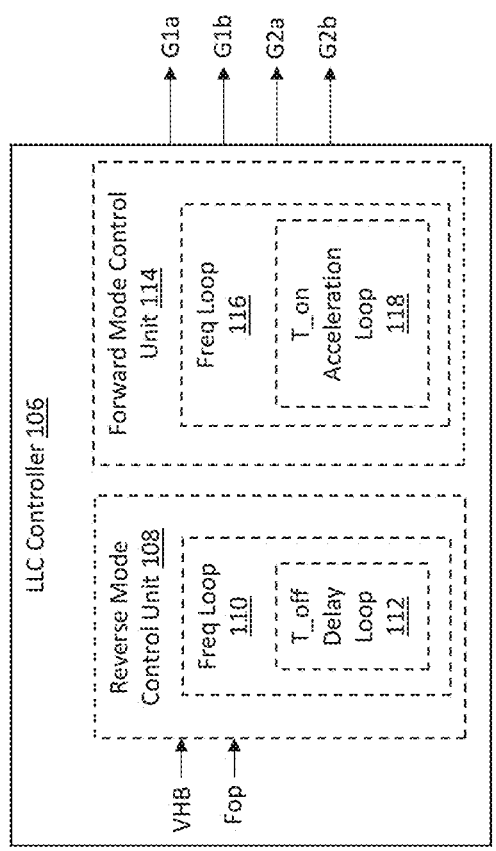
FIG. 6 illustrates a block diagram of an embodiment of the controller for the bi-directional LLC converter.

FIG. 6 illustrates an embodiment of the controller 106 for the bi-directional LLC converter 100. According to this embodiment, the controller 106 includes a reverse mode control unit 108 for increasing the operating frequency (Fop) of the bi-directional LLC converter 100 to a maximum value before delaying turn off of the switch network $Q_1$-$Q_2$ on the first side 102 of the converter 100 in reverse mode. The reverse mode control unit 108 may increase the operating frequency of the LLC converter 100 as part of a first control loop 110, and delay the turn off of the switch network $Q_1$-$Q_2$ on the first side 102 of the converter 100 as part of a second control loop 112 having a lower priority than the first control loop 110.

The LLC controller 106 may determine the amount of turn off delay for the switch network $Q_1$-$Q_2$ on the first side 102 of the bi-directional LLC converter 100 in reverse mode based on the operating frequency (Fop) and output voltage (VHB) at the first side 102 of the converter 100. For example, in the case of a voltage source converter, if the converter output voltage drops then more gain is needed. The controller 106 has information on the gain indirectly in the form of voltage, frequency and turn off delay being applied, so the controller 106 may adjust the delay to account for any frequency drop that occurs as a result of voltage drop at the output of the converter 100.

Separately or in combination, the LLC controller 106 may incrementally increase the turn off delay for the switch network $Q_1$-$Q_2$ on the first side 102 of the LLC converter 100 in reverse mode. Separately or in combination, the controller 106 may soft switch the high-voltage side Q1 of the switch network $Q_1$-$Q_2$ on the first side 102 of the LLC converter 100 and partially hard switch or hard commutate the low-voltage side Q2 of the switch network $Q_1$-$Q_2$ on the first side 102, to delay turn off of the switch network $Q_1$-$Q_2$ on the first side 102 in reverse mode. The controller 106 may instead soft switch the high-voltage side Q1 and the low-voltage side Q2 of the switch network $Q_1$-$Q_2$ on the first side 102 of the LLC converter 100, to delay turn off of the switch network $Q_1$-$Q_2$ on the first side 102 of the converter 100 in reverse mode.

Further according to the embodiment illustrated in FIG. 6, the LLC controller 106 may also include a forward mode control unit 114 for increasing the operating frequency of the bi-directional LLC converter 100 to a maximum value before advancing turn on of the switch network $Q_5$-$Q_8$ on the second side 104 of the converter 100 in forward mode. The forward mode control unit 114 may increase the operating frequency of the LLC converter 100 as part of a first control loop 116, and advance the turn on of the switch network $Q_5$-$Q_8$ on the second side 104 of the converter 100 as part of a second control loop 118 having a lower priority than the first control loop 116.

Separately or in combination, the LLC controller 106 may incrementally increase the turn on advancement for the switch network $Q_5$-$Q_8$ on the second side 104 of the bi-directional LLC converter 100 in forward mode. Separately or in combination, the LLC controller 106 may soft switch the high-voltage side $Q_5$, $Q_7$ of the switch network $Q_5$-$Q_8$ on the second side 104 of the converter 100 and hard commutate the $Q_6$, $Q_8$ of the switch network $Q_5$-$Q_8$ on the second side 104, to advance turn on of the switch network $Q_5$-$Q_8$ on the second side 104 of the converter 100 in forward mode.

Figure 7:
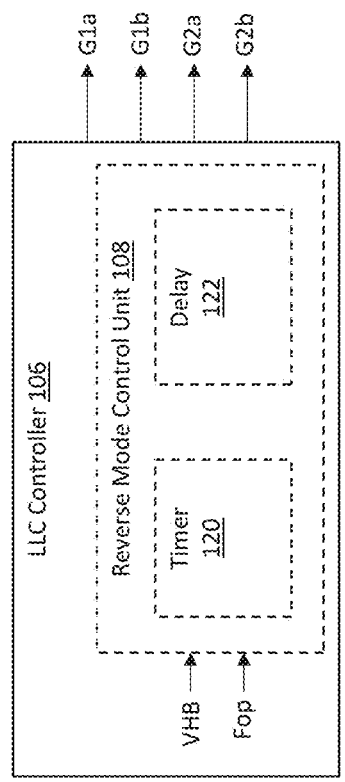
FIG. 7 illustrates a block diagram of another embodiment of the controller for the bi-directional LLC converter.

FIG. 7 illustrates another embodiment of the controller 106 for the bi-directional LLC converter 100. According to this embodiment, the reverse mode control unit 108 of the controller 106 includes a timer 120 and a delay block 122 for delaying the turn off of the switch network $Q_1$-$Q_2$ on the first side 102 of the converter 100 in reverse mode. The timer 120 determines the turn off-time for the switch network $Q_1$-$Q_2$ on the first side 102 of the converter 100, and the delay block 122 adds delay to the turn off time in reverse mode. The delay added by the delay block 122 may be programmable.

Frequency control is the typical modulation scheme for LLC converters. When the limit of typical boosting or bucking is reached via standard frequency control, the delay mechanisms described herein may take over. That is, turn off delay may be implemented on the first side 102 of the bi-directional LLC converter 100 in reverse mode for additional boosting, and early turn on may be implemented on the second side 104 of the LLC converter 100 in forward mode for additional bucking. In both cases, and by operating the LLC converter 100 above resonance, the area of transferred energy may be modulated using the modulation scheme described herein, by shifting the starting point of energy transfer up or down. For example, by delaying turn off of the first side 102 of the bi-directional LLC converter 100 in reverse mode, the controller 106 shifts the start of power transfer up to increase the amount of energy being transferred. By advancing turn on at the second side 102 of the LLC converter 100 in forward mode, the controller 106 shifts the start of the power transfer down to decrease the amount of energy being transferred. In this case, the energy transfer starts under the magnetizing current (decreased energy) as shown in FIG. 4A.

Figure 8:
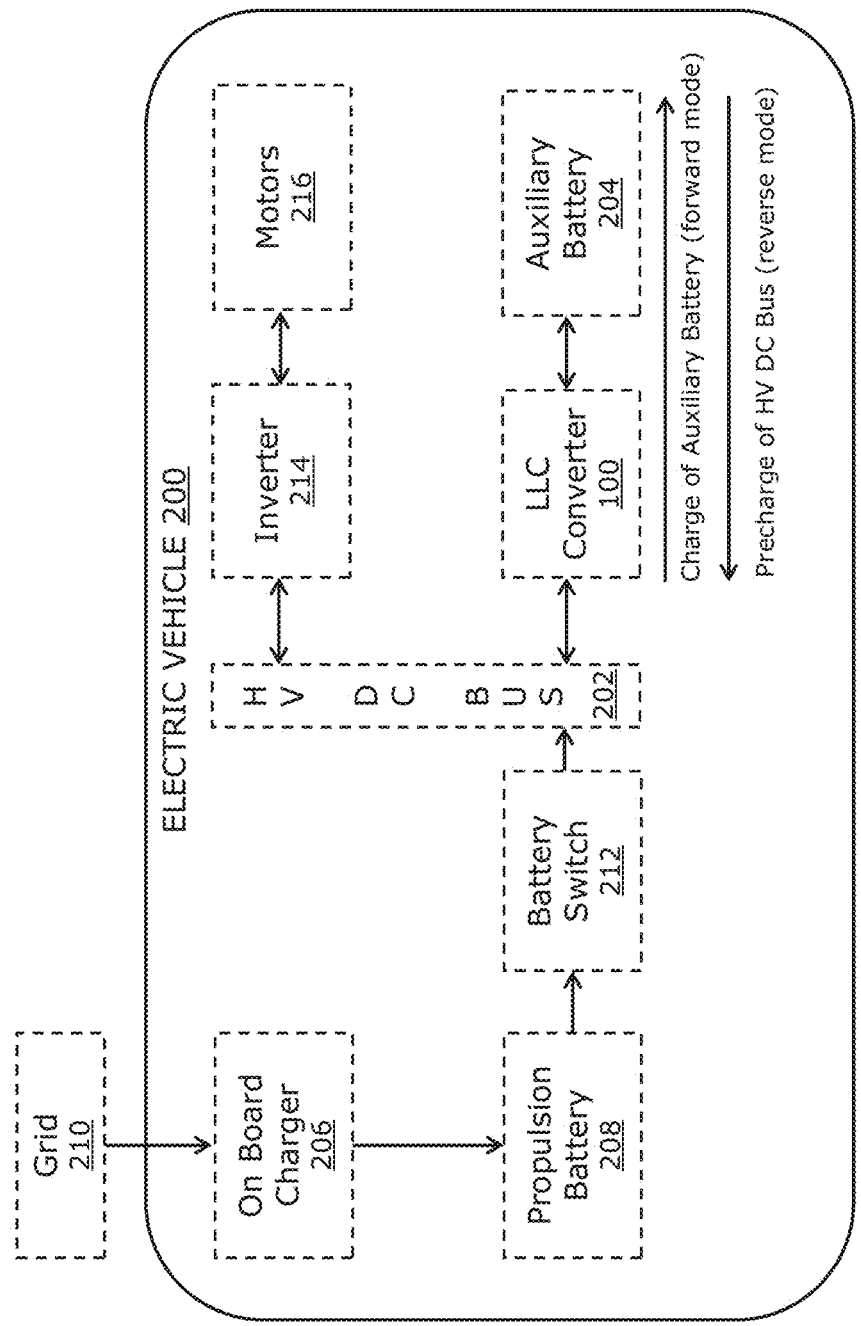
FIG. 8 illustrates a block diagram of an embodiment of an electronic system that includes the bi-directional LLC converter.

FIG. 8 illustrates an embodiment of an electronic system 200 that includes the bi-directional LLC converter 100 shown in FIG. 1. The electronic system 200 also includes a voltage bus 202 and a battery 204. The bi-directional LLC converter 100 charges the battery 204 from the voltage bus 202 in forward mode, and discharges the battery 204 onto the voltage bus 202 in reverse mode. The switch network $Q_5$-$Q_8$ on the second side 104 of the bi-directional LLC converter 100 connects the second winding $T_{r2}$ of the isolation transformer to the battery 204 of the electronic system 200. In forward mode, the bi-directional LLC converter 100 transfers energy from the voltage bus 202 to the battery 204. In reverse mode, the bi-directional LLC converter 100 transfers energy from the battery 204 to the voltage bus 202. In reverse mode, the LLC controller 106 delays turn off of the switch network $Q_5$-$Q_8$ on the second side 104 of the bi-directional LLC converter 100 at an operating frequency above resonance of the bi-directional LLC converter 100, to yield a gain greater than one in reverse mode.

In one embodiment, the electronic system 200 is part of an electric vehicle, the voltage bus 202 is a high-voltage DC bus ('HV DC BUS') and the battery 204 is an auxiliary battery. According to this embodiment, the electronic system 200 also includes an on-board charger 206 for charging a propulsion battery 208 from a power grid 210, a battery switch 212 for connecting the propulsion battery 208 to the voltage bus 202 and an inverter 214 for coupling the high-voltage DC bus 202 to motors 216 which propel the electric vehicle.

In the case of an electric vehicle as the electronic system 200, the battery switch 212 is configured to disconnect the propulsion battery 208 from the high-voltage DC bus 202 if the electric vehicle is idle. The LLC controller 106 operates the bi-directional LLC converter 100 in reverse mode if the propulsion battery 208 is disconnected from the high-voltage DC bus 202, so that the high-voltage DC bus can be pre-charged via the auxiliary battery 204. For example, the high-voltage DC bus 202 may be pre-charged from a 12V auxiliary battery 204 to a much higher level such as 400V, 700V, etc. Also, the auxiliary battery 204 may be tested in reverse mode, e.g., to check the remaining lifetime of the auxiliary battery 204. While there may be some efficiency loss by delaying turn off delay in reverse mode due to higher RMS currents, the reverse mode is implemented only a fraction of the time. That is, the LLC controller 106 may operate the bi-directional LLC converter 100 in forward mode most of the time.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An bi-directional LLC converter, comprising:
a first side coupled to a second side by an isolation transformer, the first side comprising a switch network connected to an LLC network, the LLC network including a first winding of the isolation transformer, the second side comprising a switch network connected to a second winding of the isolation transformer; and
a controller operable to operate the bi-directional LLC converter in a forward mode in which the first side functions as an inverter and the second side functions as a rectifier, and to operate the bi-directional LLC converter in a reverse mode in which the second side functions as an inverter and the first side functions as a rectifier,
wherein in the reverse mode, the controller is operable to delay turn off of the switch network on the first side at an operating frequency above resonance of the bi-directional LLC converter, to yield a gain greater than one in the reverse mode.

2. The bi-directional LLC converter of claim 1, wherein the controller is operable to increase the operating frequency to a maximum value before delaying turn off of the switch network on the first side in the reverse mode.

3. The bi-directional LLC converter of claim 2, wherein the controller is operable to increase the operating frequency as part of a first control loop and delay the turn off of the switch network on the first side as part of a second control loop having a lower priority than the first control loop.

4. The bi-directional LLC converter of claim 1, wherein the controller is operable to incrementally increase the turn off delay for the switch network on the first side in the reverse mode.

5. The bi-directional LLC converter of claim 1, wherein the controller comprises a timer and a delay block for delaying the turn off of the switch network on the first side in the reverse mode.

6. The bi-directional LLC converter of claim 1, wherein the controller is operable to determine an amount of turn off delay for the switch network on the first side in the reverse mode based on the operating frequency and an output voltage at the first side of the bi-directional LLC converter.

7. The bi-directional LLC converter of claim 1, wherein the controller is operable to soft switch a high-voltage side of the switch network on the first side and partially hard switch or hard commutate a low-voltage side of the switch network on the first side, to delay turn off of the switch network on the first side in the reverse mode.

8. The bi-directional LLC converter of claim 1, wherein the controller is operable to soft switch a high-voltage side and a low-voltage side of the switch network on the first side, to delay turn off of the switch network on the first side in the reverse mode.

9. The bi-directional LLC converter of claim 1, wherein in the forward mode, the controller is operable to advance turn on of the switch network on the second side at an operating frequency above resonance of the bi-directional LLC converter, to decrease gain of the bi-directional LLC converter in the forward mode.

10. The bi-directional LLC converter of claim 9, wherein the controller is operable to increase the operating frequency to a maximum value before advancing turn on of the switch network on the second side in the forward mode.

11. The bi-directional LLC converter of claim 10, wherein the controller is operable to increase the operating frequency as part of a first control loop and advance the turn on of the switch network on the second side as part of a second control loop having a lower priority than the first control loop.

12. The bi-directional LLC converter of claim 9, wherein the controller is operable to incrementally increase the turn on advancement for the switch network on the second side in the forward mode.

13. The bi-directional LLC converter of claim 9, wherein the controller is operable to soft switch a high-voltage side of the switch network on the second side and hard commutate a low-voltage side of the switch network on the second side, to advance turn on of the switch network on the second side in the forward mode.

14. A method of operating a bi-directional LLC converter having a first side coupled to a second side by an isolation transformer, the first side comprising a switch network connected to an LLC network, the LLC network including a first winding of the isolation transformer, the second side comprising a switch network connected to a second winding of the isolation transformer, the method comprising:
operating the bi-directional LLC converter in a forward mode in which the first side functions as an inverter and the second side functions as a rectifier;
operating the bi-directional LLC converter in a reverse mode in which the second side functions as an inverter and the first side functions as a rectifier; and
in the reverse mode, delaying turn off of the switch network on the first side at an operating frequency above resonance of the bi-directional LLC converter, to yield a gain greater than one in the reverse mode.

15. The method of claim 14, further comprising:
increasing the operating frequency to a maximum value before delaying turn off of the switch network on the first side in the reverse mode.

16. The method of claim 14, further comprising:
determining an amount of turn off delay for the switch network on the first side in the reverse mode based on the operating frequency and an output voltage at the first side of the bi-directional LLC converter.

17. The method of claim 14, further comprising:
in the forward mode, advancing turn on of the switch network on the second side at an operating frequency above resonance of the bi-directional LLC converter, to decrease gain of the bi-directional LLC converter in the forward mode.

18. The method of claim 17, further comprising:
increasing the operating frequency to a maximum value before advancing turn on of the switch network on the second side in the forward mode.

19. An electronic system, comprising:
a voltage bus;
a battery; and
a bi-directional LLC converter comprising:
a first side coupled to a second side by an isolation transformer, the first side comprising a switch network connecting the voltage bus to an LLC network, the bi-directional LLC network including a first winding of the isolation transformer, the second side comprising a switch network connecting a second winding of the isolation transformer to the battery; and
a controller operable to operate the bi-directional LLC converter in a forward mode in which energy is transferred from the voltage bus to the battery, and to operate the bi-directional LLC converter in a reverse mode in energy is transferred from the battery to the voltage bus, wherein in the reverse mode, the controller is operable to delay turn off of the switch network on the first side at an operating frequency above resonance of the bi-directional LLC converter, to yield a gain greater than one in the reverse mode.

20. The electronic system of claim 19, wherein the battery is an auxiliary battery of an electric vehicle, wherein the voltage bus connects the bi-directional LLC converter to a battery switch for a propulsion battery of the electric vehicle, wherein the battery switch is configured to disconnect the propulsion battery from the voltage bus if the electric vehicle is idle, and wherein the controller is operable to operate the bi-directional LLC converter in the reverse mode if the propulsion battery is disconnected from the voltage bus, so that the voltage bus can be pre-charged via the auxiliary battery.

\* \* \* \* \*

UNITED STATES PATENT AND TRADEMARK OFFICE
CERTIFICATE OF CORRECTION

PATENT NO. : 11,050,354 B2
APPLICATION NO. : 16/585166
DATED : June 29, 2021
INVENTOR(S) : M. Escudero Rodriguez et al.

Page 1 of 1

It is certified that error appears in the above-identified patent and that said Letters Patent is hereby corrected as shown below:

In the Claims

Column 11, Line 6 please change "An bi-directional" to -- A bi-directional --

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*